(12) United States Patent
Cutler

(10) Patent No.: US 8,432,432 B2
(45) Date of Patent: Apr. 30, 2013

(54) EYE GAZE REDUCTION

(75) Inventor: Ross G. Cutler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 12/959,569

(22) Filed: Dec. 3, 2010

(65) Prior Publication Data

US 2012/0140023 A1 Jun. 7, 2012

(51) Int. Cl.
*H04N 7/14* (2006.01)

(52) U.S. Cl.
USPC .................. 348/14.16; 348/14.08; 348/14.09

(58) Field of Classification Search ..... 348/14.01–14.16
See application file for complete search history.

(56) References Cited

U.S. PATENT DOCUMENTS

| | | | | |
|---|---|---|---|---|
| 6,507,356 B1 * | 1/2003 | Jackel et al. | ............... | 348/14.06 |
| 6,771,303 B2 | 8/2004 | Zhang et al. | | |
| 6,806,898 B1 | 10/2004 | Toyama et al. | | |
| 7,570,803 B2 | 8/2009 | Criminisi et al. | | |
| 2011/0193935 A1 * | 8/2011 | Gorzynski | ................. | 348/14.08 |
| 2011/0216153 A1 * | 9/2011 | Tasker | ........................ | 348/14.02 |

OTHER PUBLICATIONS

"Eye-to-Eye Video: Interesting Thing of the Day," Published Date: Jul. 23, 2004, http://itotd.com/articles/254/eye-to-eye-video/, 7 pgs.
C. Lawrence Zitnick et al., "Manipulation of Video Eye Gaze and Head Orientation for Video Teleconferencing", Published Date: Jun. 16, 1999, http://research.microsoft.com/pubs/69710/tr-99-46.doc, pp. 1-13.
Jim Gemmell et al., "Gaze Awareness for Videoconferencing: A Software Approach," Published Date: Oct.-Dec. 2000, http://research.microsoft.com/en-us/um/people/larryz/GazeAwareness.pdfm pp. 26-35.
Roel Vertegaal et al., "GAZE-2: Conveying Eye Contact in Group Video Conferencing Using Eye-Controlled Camera Direction," Published Date: Apr. 5-10, 2003, 8 pgs.
A. Pérez et al., "A Precise Eye-Gaze Detection and Tracking System," Published Date: Feb. 3-7, 2003, http://citeseerx.ist.psu.edu/viewdoc/download?doi=10.1.1.14.6318&rep=rep1&type=pdf., 4 pgs.
"Eyegaze Analysis Systems," Retrieved Date: Sep. 13, 2010, http://www.eyegaze.com/content/eyegaze-analysis-systems, 2 pgs.
Roel Vertegaal et al., "Explaining Effects of Eye Gaze on Mediated Group Conversations: Amount or Synchronization?," http://citeseerx.ist.psu.edu/viewdoc/download?doi=10.1.1.135.9028&rep=rep1&type=pdf, 8 pgs.

(Continued)

*Primary Examiner* — Melur Ramakrishnaiah
(74) *Attorney, Agent, or Firm* — Merchant & Gould

(57) ABSTRACT

Eye gaze reduction may be provided. First, a location of a near-end camera relative to a near-end screen may be determined. Next, based upon the determined location of the near-end camera, a location may be determined for a video window on the near-end screen. The determined location for the video window may be configured to reduce an eye gaze error in a near-end image transmitted to a far-end device from the near-end camera. Then video data from a far-end camera corresponding to the far-end device may be received and rendered in the video window at the determined location for the video window on the near-end screen.

23 Claims, 14 Drawing Sheets

OTHER PUBLICATIONS

Rembert R. Stokes, "Human Factors and Appearance Design Considerations of the Mod II PICTUREPHONE Station Set," http://ieeexplore.ieee.org/stamp/stamp.jsp?arnumber=01090060, IEEE Transactions on Communication Technology, vol. COM-17, No. 2, Apr. 1969, 6 pgs.

Ruigang Yang et al., "Eye Gaze Correction with Stereovision for Video Tele-Conferencing," Dec. 2001, Technical Report MSR-TR-2001-119, http://citeseerx.ist.psu.edu/viewdoc/download?doi=10.1.1.8.734&rep=rep1&type=pdf, 15 pgs.

Milton Chen, "Leveraging the Asymmetric Sensitivity of Eye Contact for Videoconferencing," Apr. 2002, ACM 1-58113-453-3/02/0004, Computer Graphics Laboratory and Interactivity Laboratory, Stanford University, http://graphies.stanford.edu/papers/eye_contact/paper.pdf, 8 pgs.

* cited by examiner

US 8,432,432 B2

EYE GAZE REDUCTION

BACKGROUND

Eye gaze has been shown to be important for high task performance and conversational turn taking in video conferencing. However, the non-zero distance between the video capture devices (e.g. webcams) and video rendering devices (e.g. monitors) creates eye gaze error during video conferencing. The end result is that a far-end user looking at a near-end participant on their monitor does not appear to be looking at the near-end participant. This artifact is called eye gaze error and can be measured in degrees using the locations of the participants, cameras, and displays.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Eye gaze reduction may be provided. First, a location of a near-end camera relative to a near-end screen may be determined. Next, based upon the determined location of the near-end camera, a location may be determined for a video window on the near-end screen. The determined location for the video window may be configured to reduce an eye gaze error in a near-end image transmitted to a far-end device from the near-end camera. Then video data from a far-end camera corresponding to the far-end device may be received and rendered in the video window at the determined location for the video window on the near-end screen.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
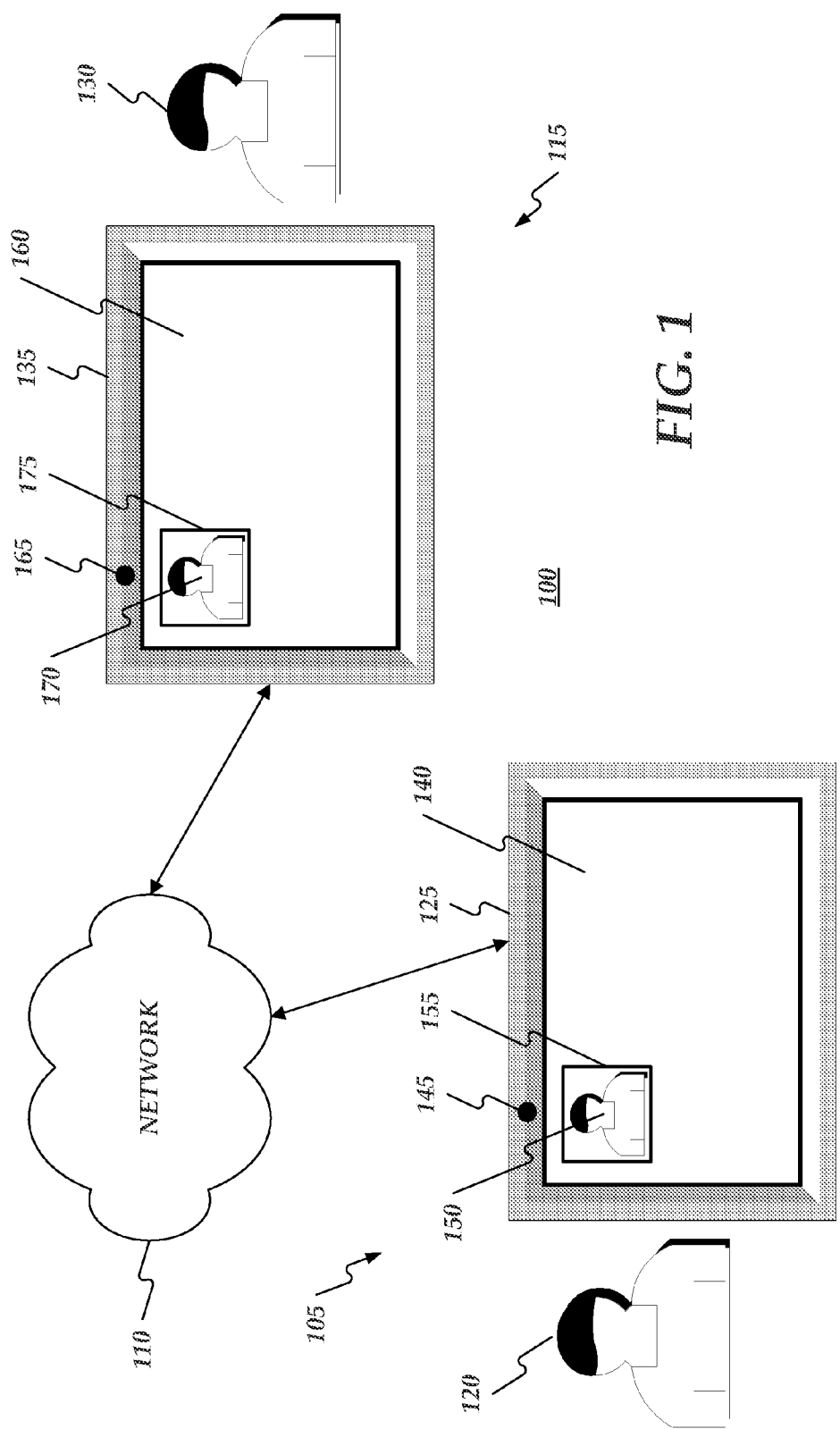
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, eye gaze error may be reduced to a level either not detectable or at least not disturbing to users. One or more cameras (e.g. integrated into a display screen) may be used that support a webcam application program interface (API) that allows the camera's location with respect to the display screen to be queried. The best camera and/or position for a video window may then be used to minimize eye gaze error. To further reduce eye gaze error, face detection and tracking may be used to better position a far-end user within an image (e.g. crop the image to put the user's head near the top of the image, closer to the camera.)

FIG. 1 shows a block diagram of an operating environment 100 consistent with embodiments of the invention. As shown in FIG. 1, operating environment 100 may include a near-end 105, a network 110, and a far-end 115. Near-end 105 may include a near-end user 120 and a near-end device 125. Far-end 115 may include a far-end user 130 and a far-end device 135. Near-end device 125 and/or far-end device 135 may comprise, but are not limited to, a desktop computer, a notebook computer, a mobile device, a smart telephone, or a personal digital assistant, for example. Network 110 may comprise the internet or any type network over which near-end device 125 and far-end device 135 may communicate. Either near-end device 125 or far-end device 135 may be implemented using, for example, a computing device 1400 as described in greater detail below with respect to FIG. 14.

Near-end device 125 may include a near-end screen 140 and a near-end camera 145. On near-end screen 140, a far-end image 150 of far-end user 130 may be displayed in a near-end video window 155. Far-end device 135 may include a far-end screen 160 and a far-end camera 165. On far-end screen 160, a near-end image 170 of near-end user 120 may be displayed in a far-end video window 175.

Near-end device 125 may use near-end camera 145 to capture near-end image 170 of near-end user 120. Near-end device 125 may transmit near-end image 170 of near-end user 120 to far-end device 135 over network 110. Far-end device 135 may then display near-end image 170 of near-end user 120 in far-end video window 175 on far-end screen 160.

Far-end device 135 may use far-end camera 165 to capture far-end image 150 of far-end user 130. Far-end device 135 may transmit far-end image 150 of far-end user 130 to near-end device 125 over network 110. Near-end device 125 may then display far-end image 150 of far-end user 130 in near-end video window 155 on near-end screen 140. Consistent with embodiments of the invention, near-end device 125 may position near-end video window 155 close to near-end camera 145 to reduce eye gaze error. Furthermore, near-end device 125 may crop far-end image 150 of far-end user 130 within near-end video window 155 to reduce space between end user 130's head in far-end image 150 and near-end camera 145.

Figure 3:
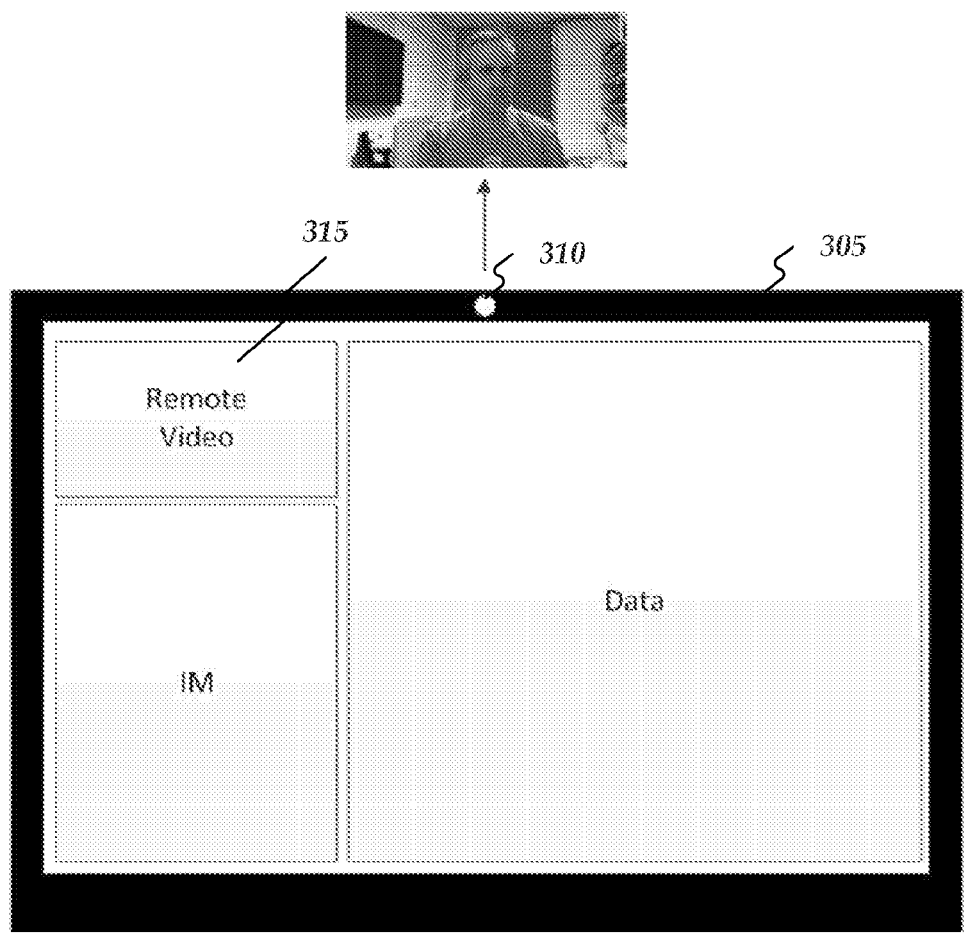
FIG. 3 shows an example of eye gaze error with a 24" monitor.
Figure 4:
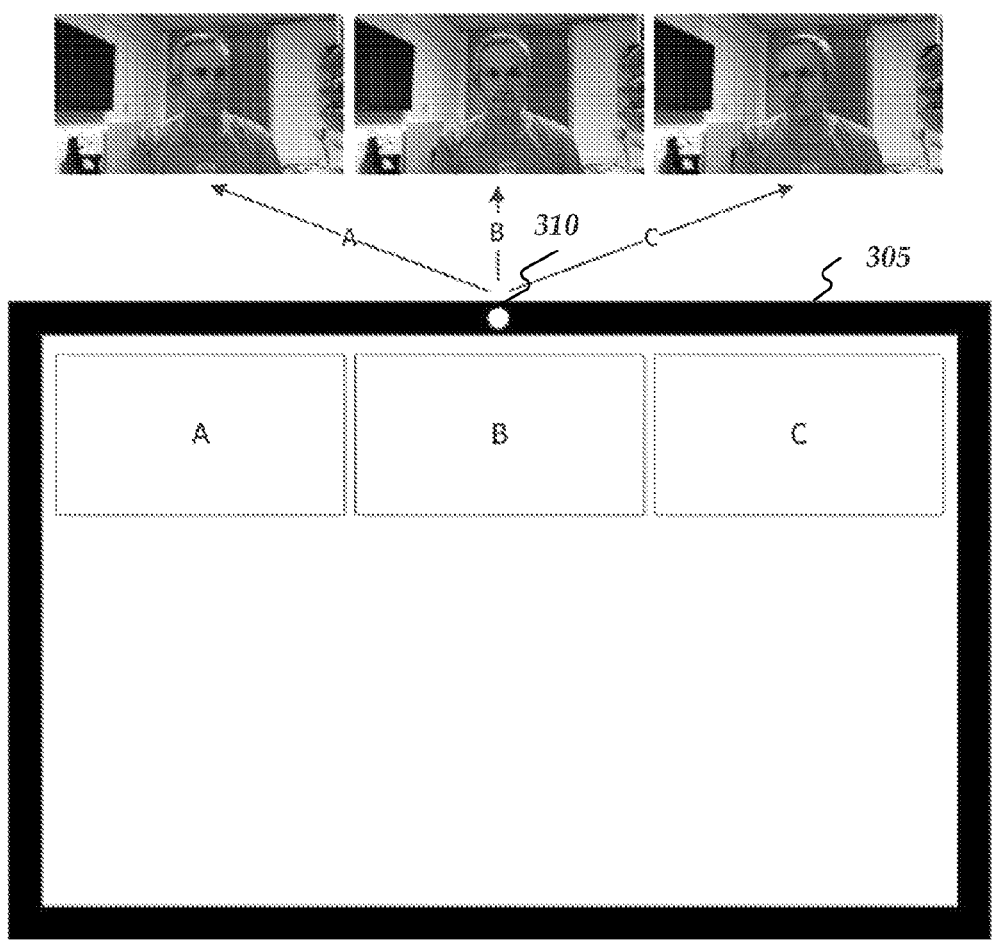
FIG. 4 shows an example of a 4-way video conference.
Figure 5:
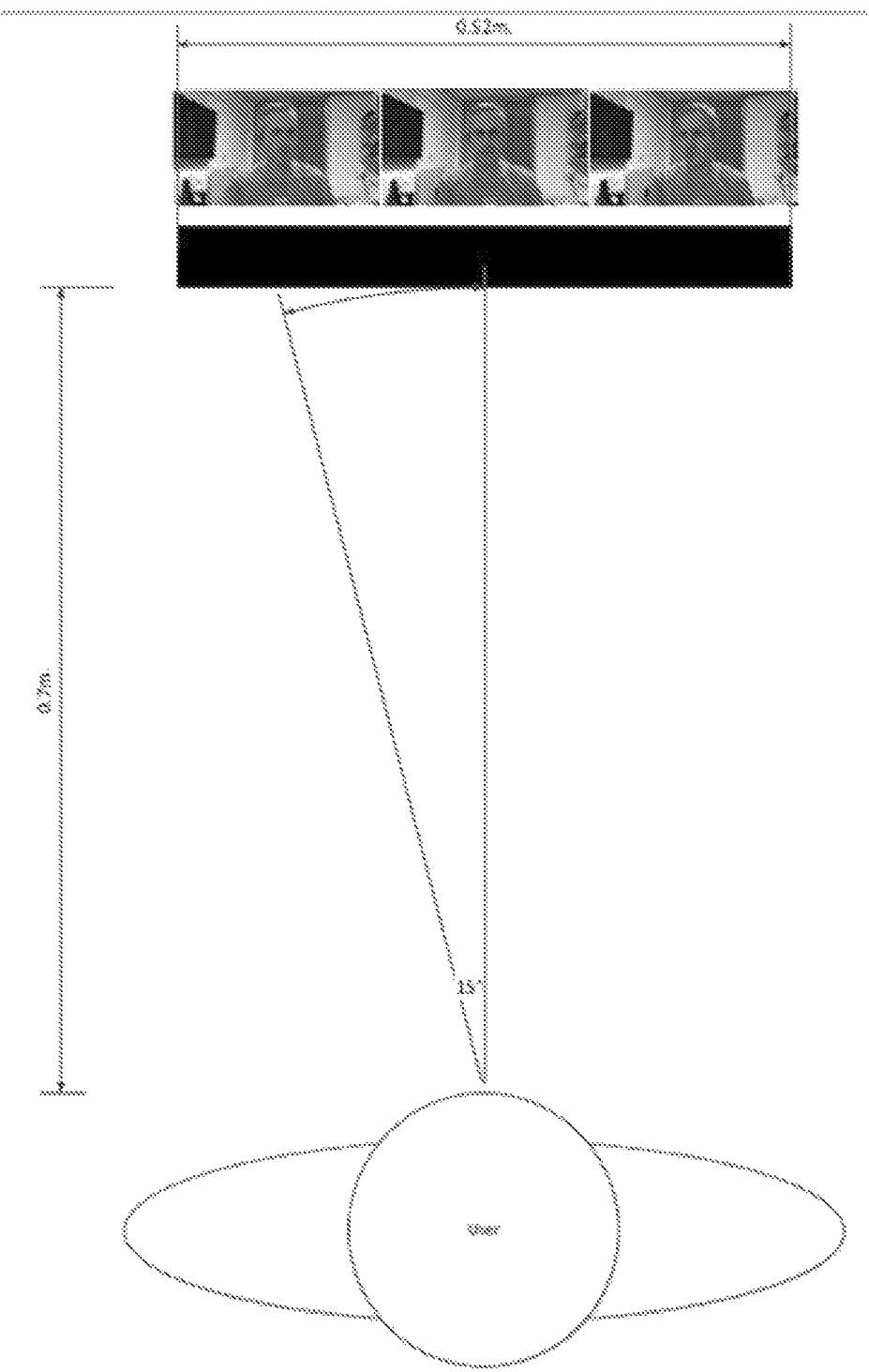
FIG. 5 shows an example of horizontal eye gaze error.
Figure 6:
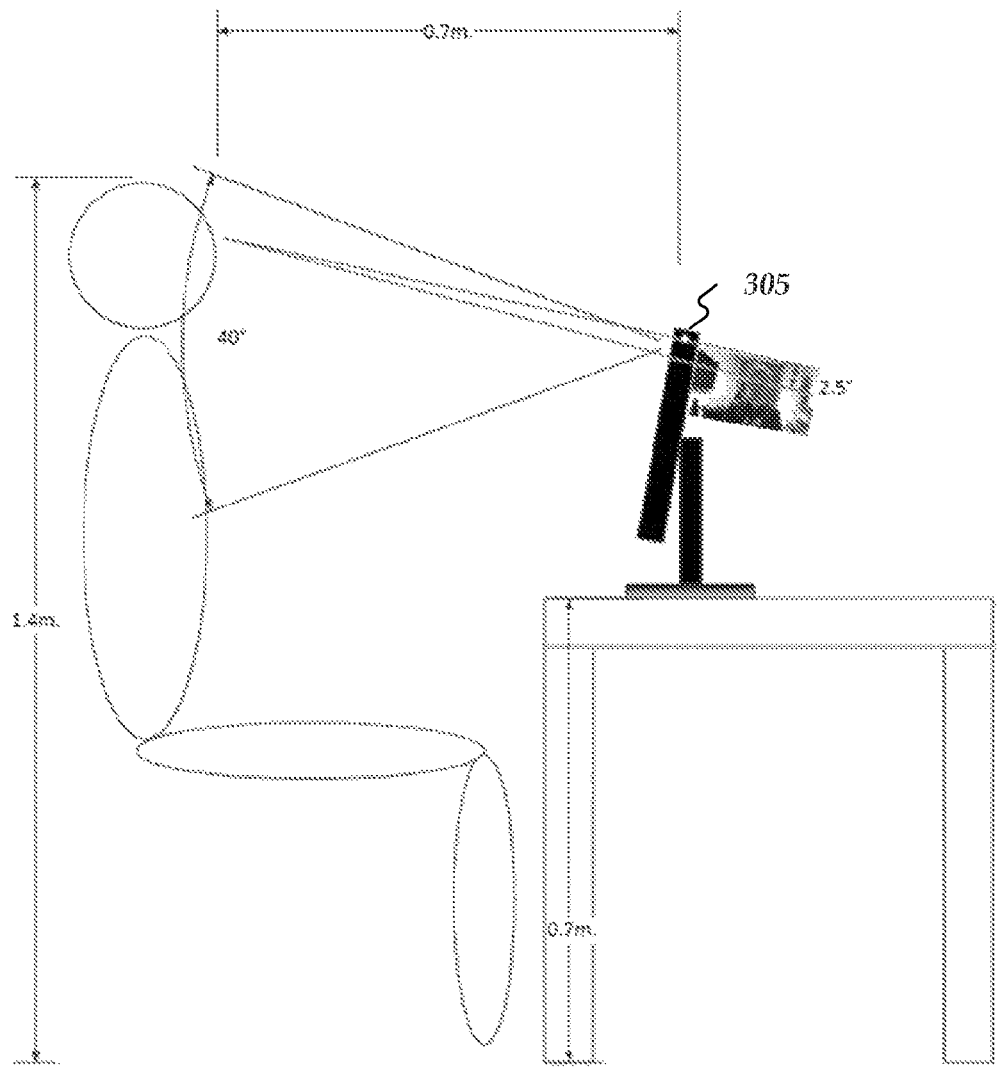
FIG. 6 shows a vertical eye gaze error in data sharing mode.
Figure 7:
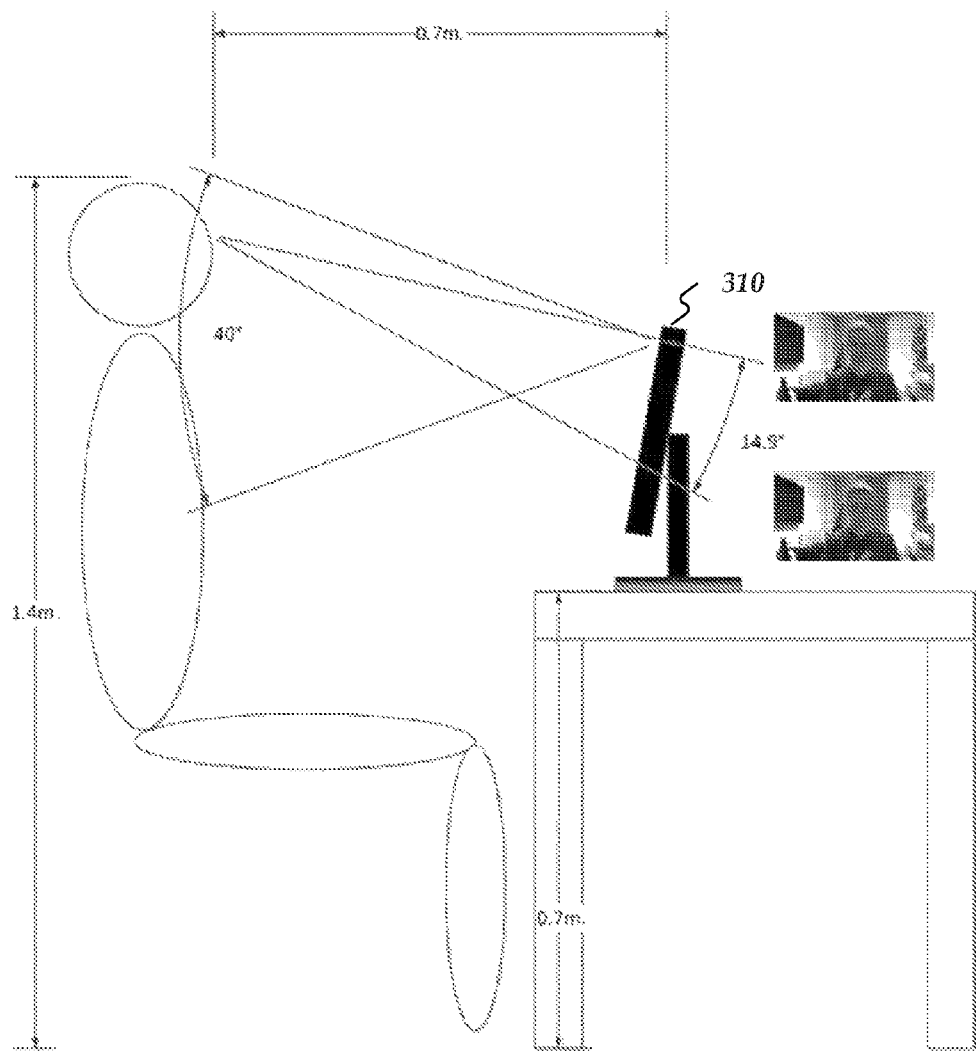
FIG. 7 shows an induced vertical eye gaze error.

FIG. 3 shows an example of eye gaze error with a 24" monitor 305 and a single centrally mounted webcam 310. When a near-end user is looking at a far-end video window 315, about 15° of horizontal eye gaze may be induced as shown in greater detail in FIG. 5. FIG. 4 shows an example of a 4-way video conference with the same 24" monitor 305 and single webcam 310. When the near-end user looks at remote parties A or C about 15° of horizontal eye gaze error may be induced. FIG. 6 shows that a vertical eye gaze error in data sharing mode may be about 2.5°. If the video windows are tiled on the left or right side of monitor 305 as shown in FIG. 7, then the vertical eye gaze error induced may also be about 15°.

Figure 2:
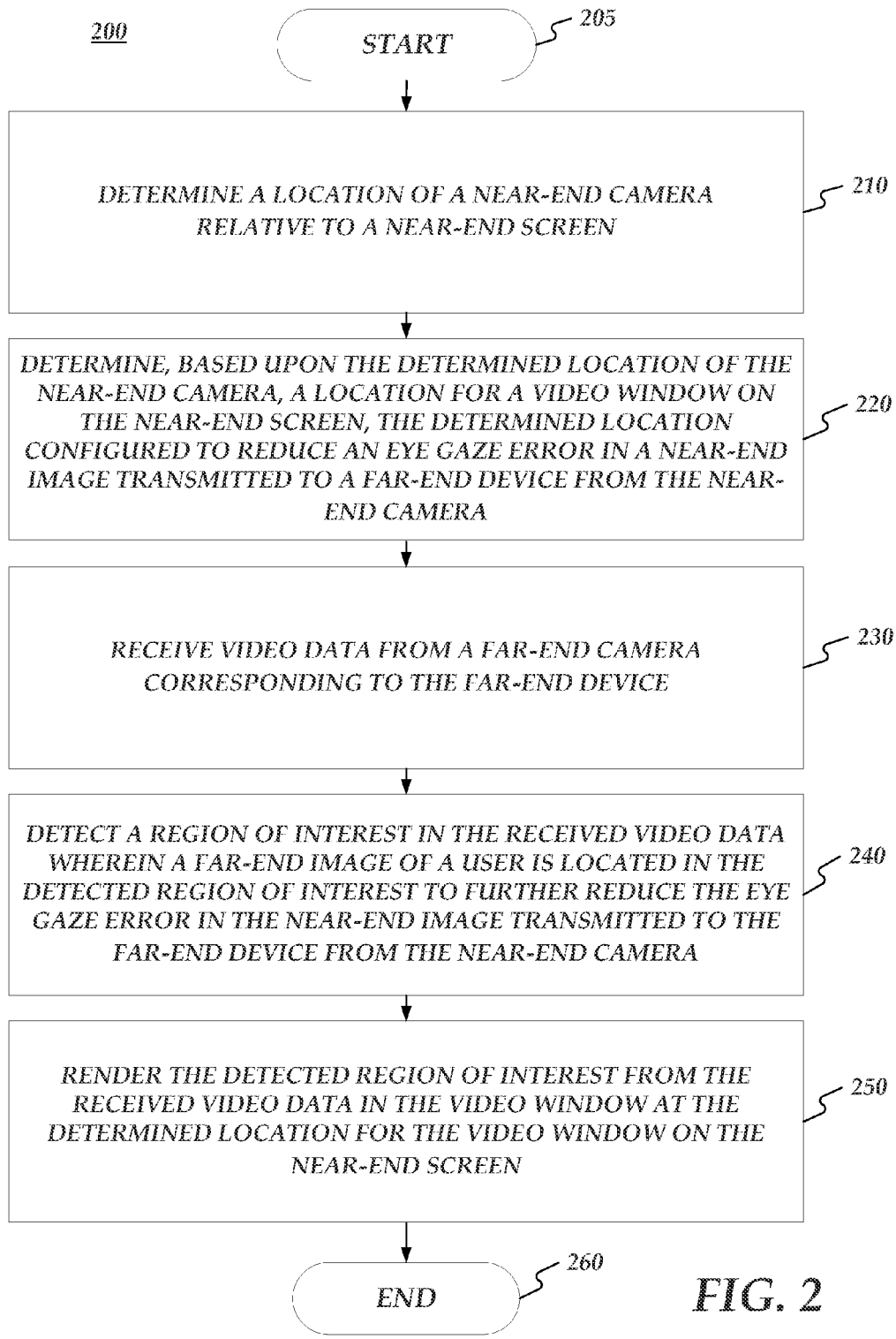
FIG. 2 is a flow chart of a method for providing eye gaze reduction.

FIG. 2 is a flow chart setting forth the general stages involved in a method 200 consistent with an embodiment of the invention for providing eye gaze reduction. Method 200 may be implemented using near-end device 125 comprising, for example, computing device 1400 as described in more detail below with respect to FIG. 14. Ways to implement the stages of method 200 will be described in greater detail below.

Method 200 may begin at starting block 205 and proceed to stage 210 where near-end device 125 may determine a location of near-end camera 145 relative to near-end screen 140. For example, one or more cameras (e.g. integrated into a display screen) may be used that support a webcam application program interface (API) that may allow the camera's (e.g. near-end camera 145) location with respect to the display screen (e.g. near-end screen 140) to be queried.

From stage 210, where near-end device 125 determines the location of near-end camera 145, method 200 may advance to stage 220 where near-end device 125 may determine, based upon the determined location of near-end camera 145, a location for near-end video window 155 on near-end screen 140. The determined location may be configured to reduce a horizontal eye gaze error in near-end image 170 transmitted to far-end device 135 from near-end camera 145. For example, the best camera and/or position for a video window (e.g. near-end video window 155) may be used to minimize eye gaze error. The eye gaze error may be reduced to 4.5% or less.

Figure 8:
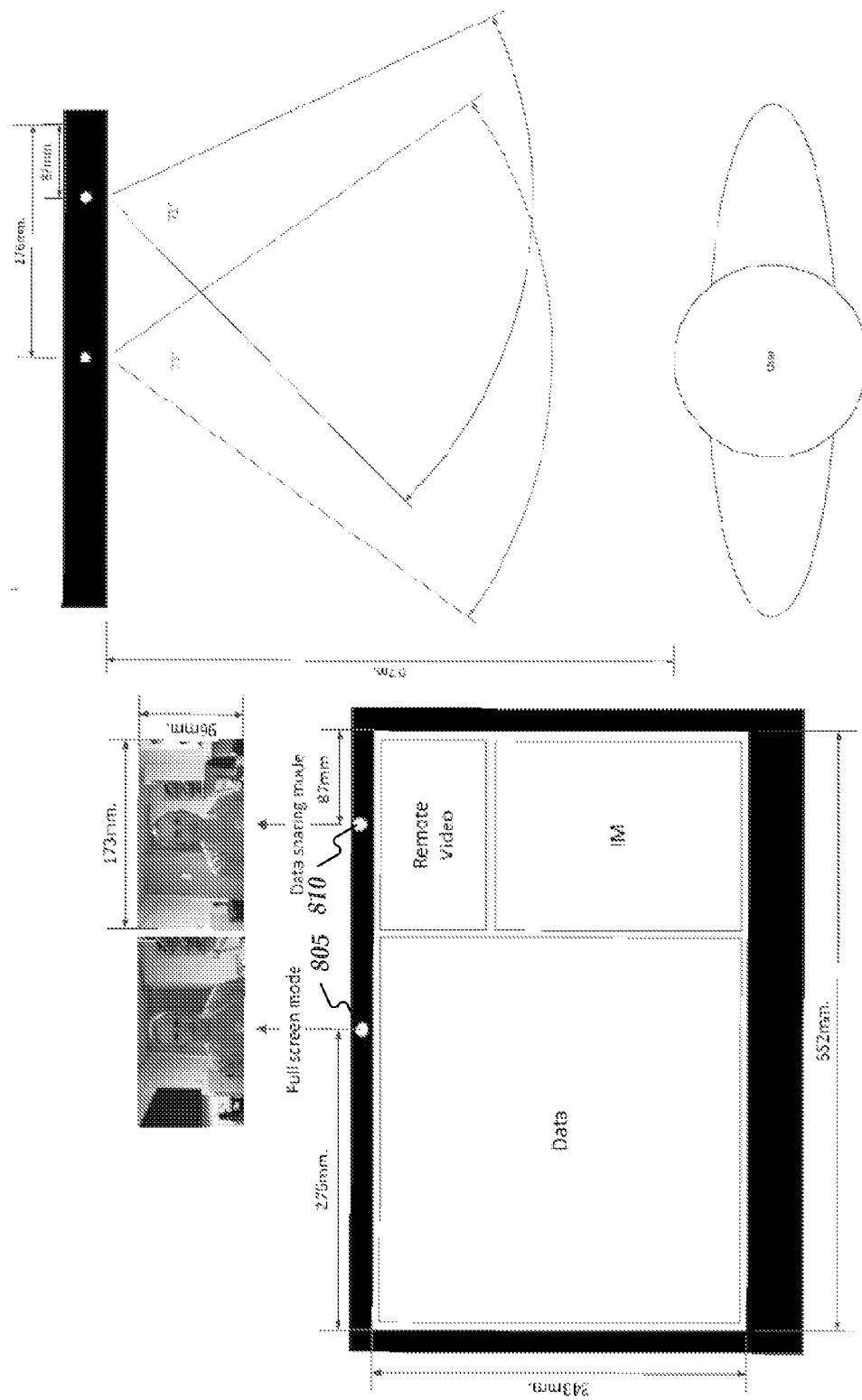
FIG. 8 shows a two camera display.
Figure 9:
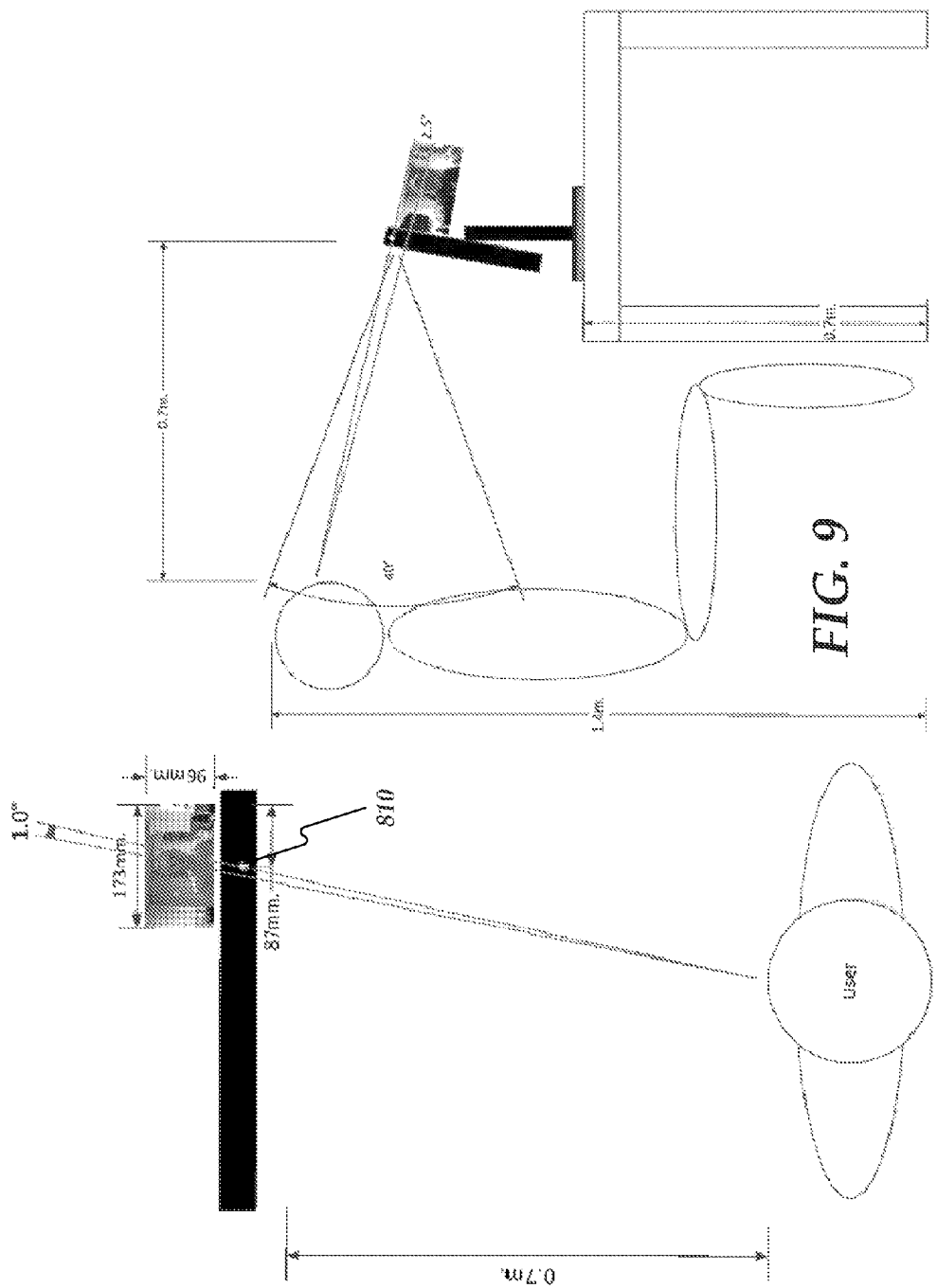
in FIG. 9 shows an improvement in eye gaze error.

Many notebook computers and desktop monitors ship with integrated webcams. As shown in FIG. 3, one location for integrated webcam 310 may be the top center of monitor 305 that may be ideal for a full screen video mode, but not for a data sharing mode. Integrated webcams are relatively inexpensive and multiple webcams can be installed to significantly improve the eye gaze. For example, FIG. 8 shows a two camera display that may have a full screen mode webcam 805 in the top center and a data sharing mode webcam 810 in the top left. The improvement in eye gaze error is significant and shown in FIG. 9 and Table 1 below. Data sharing mode webcam 810 webcam may be a VGA webcam while full screen mode webcam 805 may be HD.

TABLE 1

|  | 1 webcam monitor | 2 webcam monitor |
|---|---|---|
| Horizontal eye gaze error | 15° | 1° |
| Vertical eye gaze error | 2.5° | 2.5° |

Figure 10:
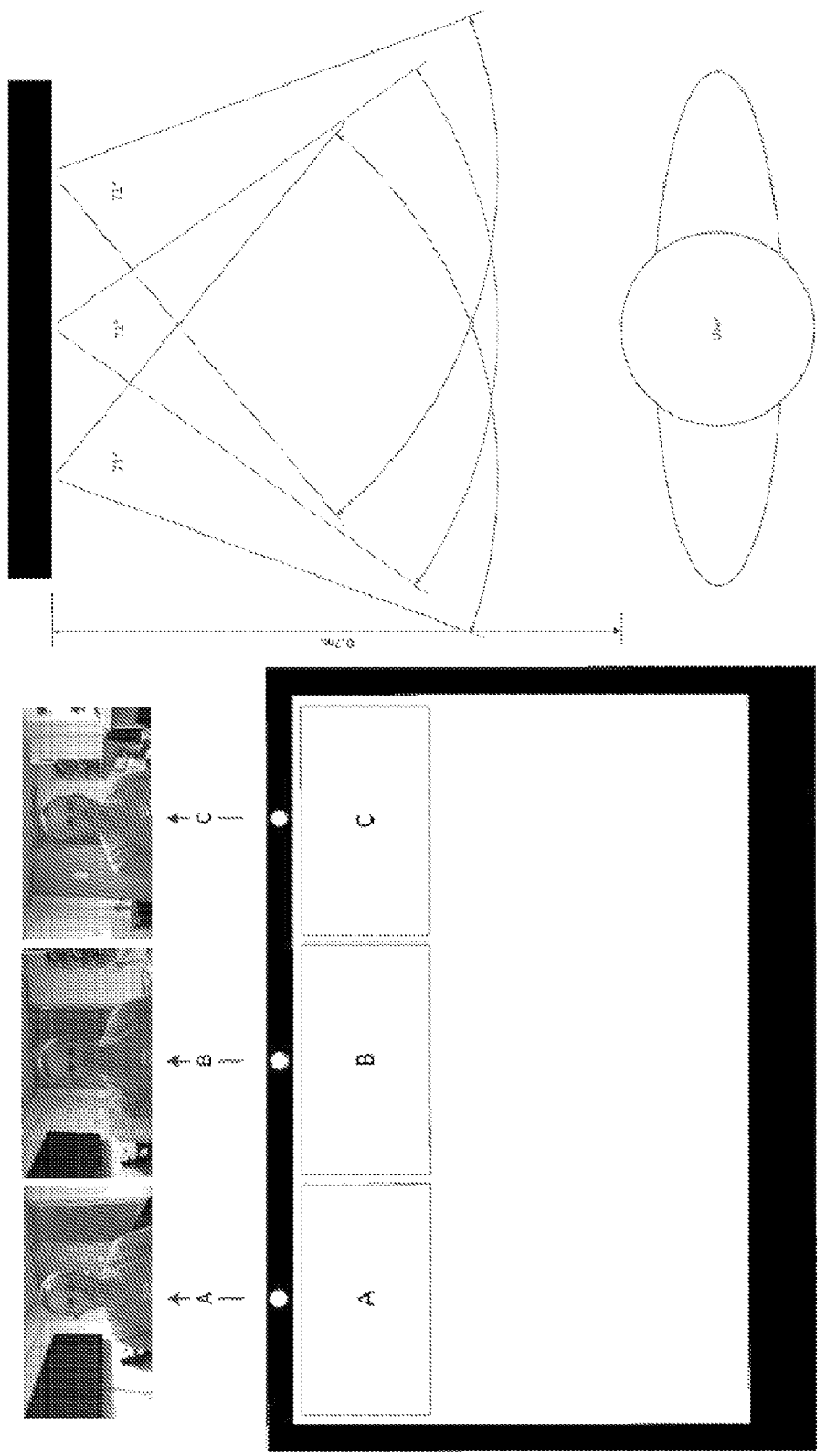
FIG. 10 shows a 4-way video conference mode using a three camera monitor.

For a 4-way video conference mode, a three camera monitor may be used as shown in FIG. 10. The improvement in eye gaze error in this embodiment may be even more significant and shown in Table 2. Note these angles are for properly centered heads, which is not always the case. Stage 240 below on face detection and tracking may provide low eye gaze error even when the user is not in the optimal position with respect to the camera.

TABLE 2

|  | 1 webcam monitor | 3 webcam monitor |
|---|---|---|
| Horizontal eye gaze error | 15° | 1° |
| Vertical eye gaze error | 2.5° | 2.5° |

Figure 11:
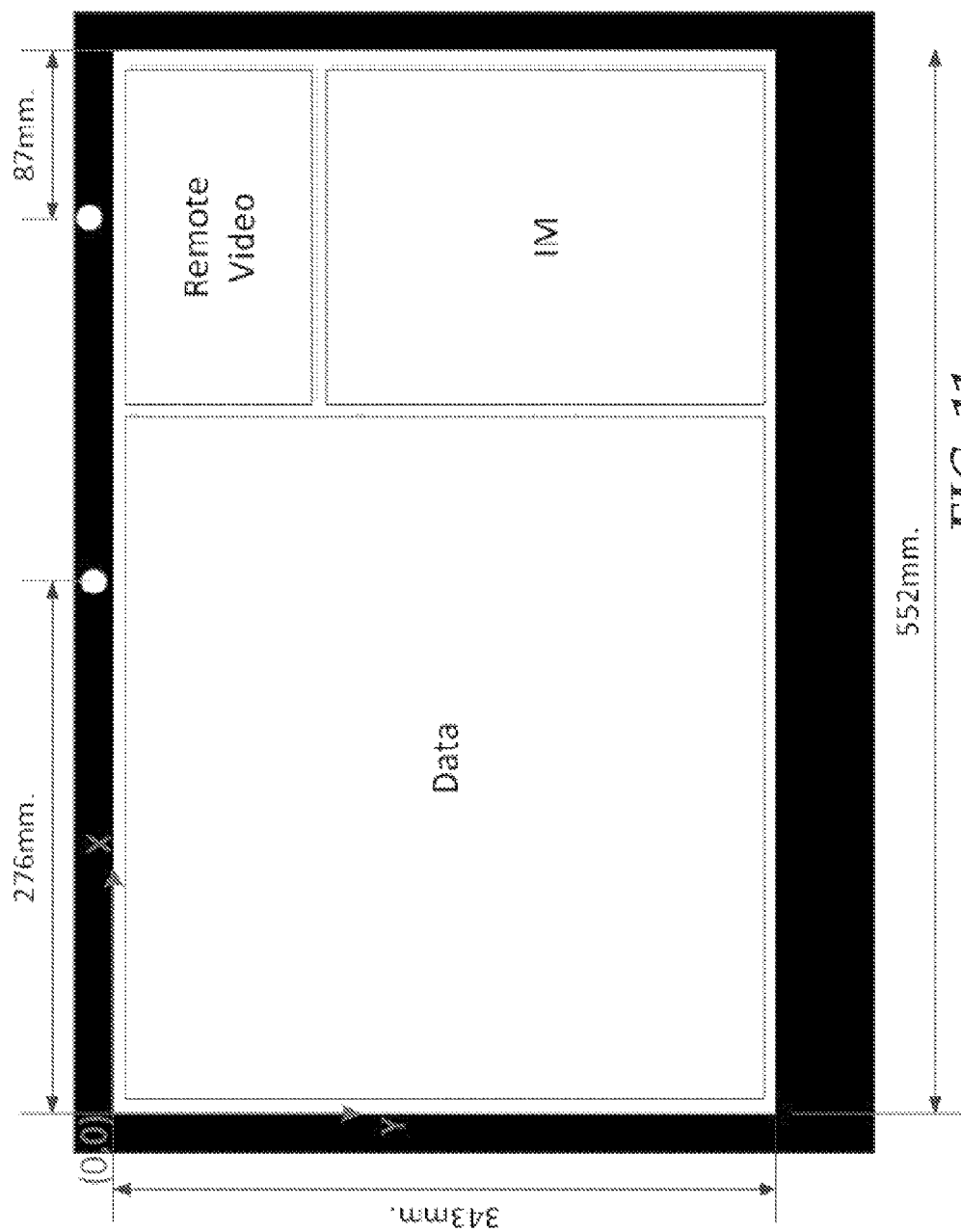
FIG. 11 shows a coordinate system that may be used in camera locations.

The following interface may allow OC (or WLM) to query the webcam APIs. The IKsPropertySet::CAMERA_LOCATION GUID may be defined below:

```
// {TBD}
DEFINE_GUID(NOISE_REDUCTION,
    TBD);
The IKsPropertySet::CAMERA_LOCATION property is used in the
following ways.
See FIG. 11 for the coordinate system that may be used in the camera
locations.
#define MAX_CAMERA_LOCATIONS 16
struct CAMERA_LOCATION_S {
    USHORT num_webcams;
    USHORT monitor_width; // in mm
    USHORT monitor_height; // in mm
    SHORT camera_x[MAX_CAMERA_LOCATIONS]; // in mm
    SHORT camera_y[MAX_CAMERA_LOCATIONS]; // in mm
};
```

To query if the display supports camera location:

```
IKsPropertySet *propertySet = ...
HRESULT hresult;
ULONG supported;
hresult = propertySet ->QuerySupported(CAMERA_LOCATION, 0,
&supported);
```

To query the camera locations:

```
IKsPropertySet *propertySet = ...
HRESULT hresult;
CAMERA_LOCATION_S camera_location;
hresult = propertySet -> Get(CAMERA_LOCATION, 0, 0, 0, &
camera_location,
    sizeof(camera_location));
```

Below are some rules that may minimize eye gaze given a monitor or monitors with multiple webcams.

1. Choose the camera that minimizes the distance between the video render window $W_i$ and the camera $C_i$:

$$i = \underset{i}{\operatorname{argmin}} \left\| \vec{C}_i - \vec{W}_i \right\|$$

Consider all cameras in all monitors.

2. Add UX guidance (e.g., snaps or highlight hints) to help the user position the video renderer window to minimize the camera/video render window distance.

Once near-end device 125 determines the location for video window 155 in stage 220, method 200 may continue to stage 230 where near-end device 125 may receive video data from far-end camera 165 corresponding to far-end device 135. For example, far-end camera 165 may digitize an image of far-end user 130. Far-end device 135 may transmit the digitized image of far-end user 130 to near-end device 125. Near-end device 125 may receive the digitized image of far-end user 130 in the video data.

From stage 230, where near-end device 125 receives the video data from far-end camera 165, method 200 may advance to stage 240 where near-end device 125 may detect a region of interest (ROI) in the received video data. Far-end image 150 of far-end user 130 may be located in the detected region of interest to further reduce the horizontal eye gaze error in near-end image 170 transmitted to far-end device 135 from near-end camera 145. For example, to further reduce eye gaze error, face detection and tracking may be used to better position a user image (e.g. far-end image 150 of far-end user 130. Far-end image 150 may be cropped to put far-end user 130's head near the top of far-end image 150. In other words, near-end device 125 may crop far-end image 150 of far-end user 130 within near-end video window 155 to reduce space between end user 130's head in far-end image 150 and near-end camera 145.

Figure 12:
FIG. 12 shows a webcam image where a user is not centered.
Figure 13:
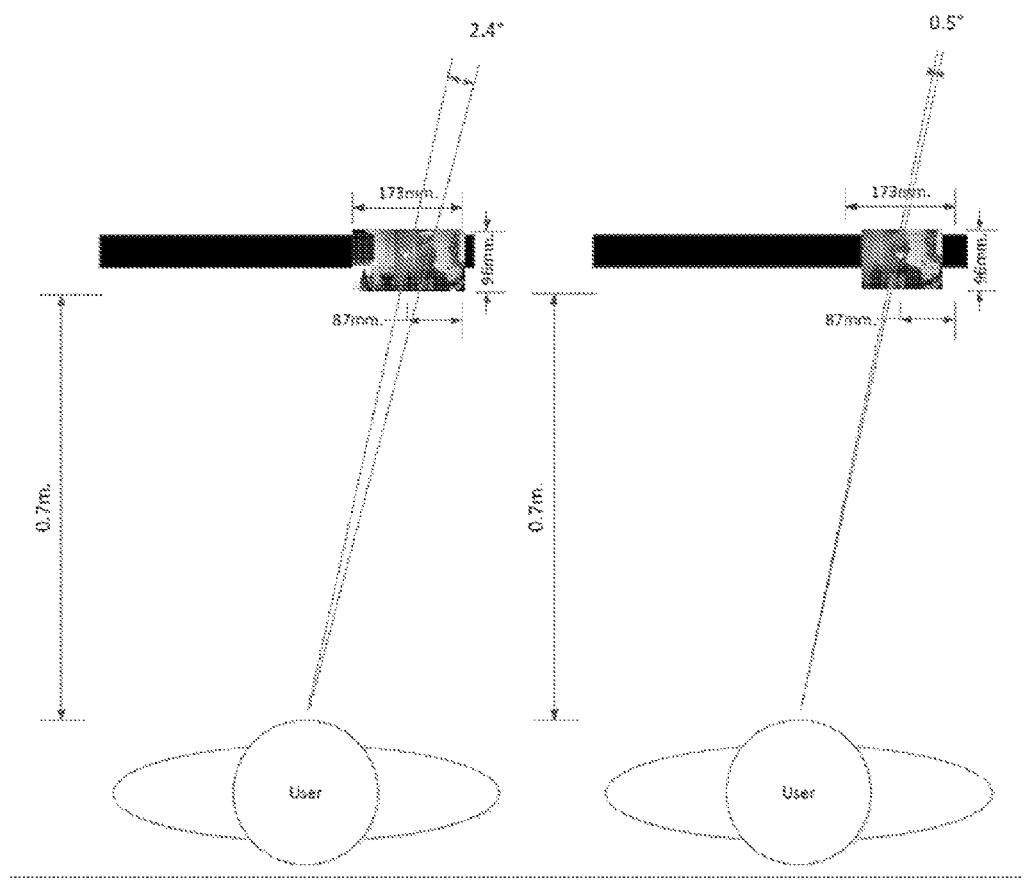
FIG. 13 shows that horizontal eye gaze error can be reduced.

As described above, eye gaze error may be reduced by reducing the distance from a camera and a display. Consistent with embodiments of the invention, further improvement can be had by implement a virtual cinematographer. In other words, further improvement can be had by knowing where a user is within the video window so that the distance from far-end user 130's eyes (in far-end image 130) to near-end camera 145 is minimized. For example, FIG. 12 shows a webcam image 1205 where the far-end user is not centered. A region of interest 1210 may be more ideal to render to minimize eye gaze error than all of webcam image 1205 because the far-end user's head is more near the top in region of interest 1210 than it was in webcam image 1205. Consequently, the head may be rendered closer to the camera if region of interest 1210 is rendered rather than all of webcam image 1205. FIG. 13 shows that the horizontal eye gaze error can be reduced by from 2.4° to <0.5°.

Consistent with embodiments of the invention, there are at least two processes for implementing this type of virtual cinematographer. First, the region of interest (ROI) may be reduced before the encoder (e.g. a camera driver can implement a virtual cinematographer.) For example, output of a 720 p webcam may be a centered 480 p stream. Then a face tracker algorithm can be used to find the location of a head in the stream. Consequently, the near-end can determine the region of interest locally before encoding. Alternatively, ROI may be reduced at a renderer. For example, the location of a head as determined by the face tracker algorithm can be sent to the far-end and the far-end device may determine how to best render the image with the head in a better location to reduce eye gaze. The pros and cons of these processes are given in Table 3.

TABLE 3

| Method | Pros | Cons |
| --- | --- | --- |
| Reducing ROI before encoder | Saves CPU | Different clients may want different experiences (e.g. one in full screen, one in data) |
| Reducing ROI at renderer | Supports arbitrary client mixes (HD, 480p, etc) | Some wasted bandwidth |

After near-end device 125 detects the region of interest in stage 240, method 200 may proceed to stage 250 where near-end device 125 may render the detected region of interest from the received video data in near-end video window 155 at the determined location for near-end video window 155 on near-end screen 140. For example, eye gaze error may be further reduced by placing far-end user 130's head closer to near-end camera 145 in near-end video window 155. Once near-end device 125 renders the detected region of interest in stage 250, method 200 may then end at stage 260.

An embodiment consistent with the invention may comprise a system for providing eye gaze reduction. The system may comprise a memory storage and a processing unit coupled to the memory storage. The processing unit may be operative to determine a location of a near-end camera relative to a near-end screen. In addition, the processing unit may be operative to determine, based upon the determined location of the near-end camera, a location for a video window on the near-end screen. The determined location may be configured to reduce an eye gaze error in a near-end image transmitted to a far-end device from the near-end camera. Moreover, the processing unit may be operative to receive video data from a far-end camera corresponding to the far-end device and render the received video data in the video window at the determined location for the video window on the near-end screen.

Another embodiment consistent with the invention may comprise a system for providing eye gaze reduction. The system may comprise a memory storage and a processing unit coupled to the memory storage. The processing unit may be operative to determine a location of a near-end camera relative to a near-end screen. Moreover, the processing unit may be operative to determine, based upon the determined location of the near-end camera, a location for a video window on the near-end screen. The determined location may be configured to reduce a horizontal eye gaze error in a near-end image transmitted to a far-end device from the near-end camera. Furthermore, the processing unit may be operative to receive video data from a far-end camera corresponding to the far-end device and to detect a region of interest in the received video data. The far-end image of a user may be located in the detected region of interest to further reduce the horizontal eye gaze error in the near-end image transmitted to the far-end device from the near-end camera. Also, the processing unit may be operative to render the detected region of interest from the received video data in the video window at the determined location for the video window on the near-end screen.

Yet another embodiment consistent with the invention may comprise a system for providing eye gaze reduction. The system may comprise a memory storage and a processing unit coupled to the memory storage. The processing unit may be operative to determine a location of a near-end camera relative to a near-end screen and to determine, based upon the determined location of the near-end camera, a location for a video window on the near-end screen. The determined location configured to produce a horizontal eye gaze error in a near-end image transmitted to a far-end device from the near-end camera may be equal to one of the following: 4.5% and less than 4.5%. Furthermore, the processing unit may be operative to receive video data from a far-end camera corresponding to the far-end device and to detect a region of interest in the received video data wherein a far-end image of a user is at the top of the detected region of interest. Also, the processing unit may be operative to render the detected region of interest from the received video data in the video window at the determined location for the video window on the near-end screen.

Figure 14:
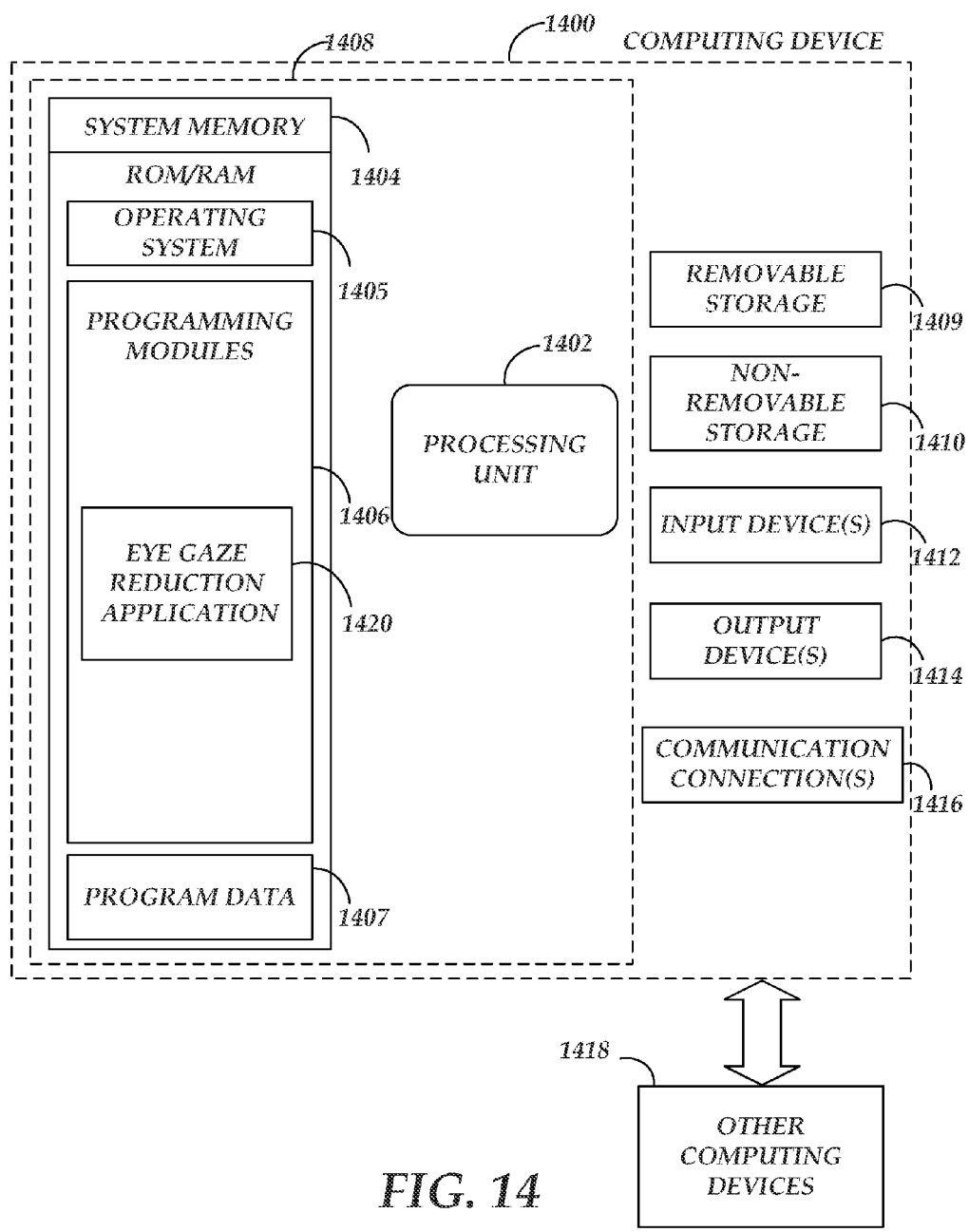
FIG. 14 is a block diagram of a system including a computing device.

FIG. 14 is a block diagram of a system including computing device 1400. Consistent with an embodiment of the invention, the aforementioned memory storage and processing unit may be implemented in a computing device, such as computing device 1400 of FIG. 14. Any suitable combination of hardware, software, or firmware may be used to implement the memory storage and processing unit. For example, the memory storage and processing unit may be implemented with computing device 1400 or any of other computing devices 1418, in combination with computing device 1400. The aforementioned system, device, and processors are examples and other systems, devices, and processors may comprise the aforementioned memory storage and processing unit, consistent with embodiments of the invention. Furthermore, computing device 1400 may comprise an operating environment for near-end device 125 or far-end device 135 as described above. Near-end device 125 or far-end device 135 may operate in other environments and is not limited to computing device 1400.

With reference to FIG. 14, a system consistent with an embodiment of the invention may include a computing device, such as computing device 1400. In a basic configuration, computing device 1400 may include at least one processing unit 1402 and a system memory 1404. Depending on the configuration and type of computing device, system memory 1404 may comprise, but is not limited to, volatile (e.g. random access memory (RAM)), non-volatile (e.g. read-only memory (ROM)), flash memory, or any combination. System memory 1404 may include operating system 1405, one or more programming modules 1406, and may include a program data 1407. Operating system 1405, for example, may be suitable for controlling computing device 1400's operation. In one embodiment, programming modules 1406 may include eye gaze reduction application 1420. Furthermore, embodiments of the invention may be practiced in conjunction with a graphics library, other operating systems, or any other application program and is not limited to any particular application or system. This basic configuration is illustrated in FIG. 14 by those components within a dashed line 1408.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computing device 1400 may also contain a communication connection 1416 that may allow device 1400 to communicate with other computing devices 1418, such as over a network in a distributed computing environment, for example, an intranet or the Internet. Communication connection 1416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1404, removable storage 1409, and non-removable storage 1410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1400. Any such computer storage media may be part of device 1400. Computing device 1400 may also have input device(s) 1412 such as a keyboard, a mouse, a pen, a sound input device, a touch input device, etc. Output device(s) 1414 such as a display, monitor, screen, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 1404, including operating system 1405. While executing on processing unit 1402, programming modules 1406 (e.g. eye gaze reduction application 1420) may perform processes including, for example, one or more method 200's stages as described above. The aforementioned process is an example, and processing unit 1402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing eye gaze reduction, the method comprising:
    determining a location of a near-end camera relative to a near-end screen;
    determining, based upon the determined location of the near-end camera, a location for a video window on the near-end screen, the determined location configured to reduce an eye gaze error in a near-end image transmitted to a far-end device from the near-end camera wherein determining the location for the video window on the near-end screen, the determined location configured to reduce the eye gaze error comprises determining the location for the video window on the near-end screen, the determined location configured to produce a horizontal eye gaze error in the near-end image transmitted to the far-end device from the near-end camera equal to one of the following: 4.5% and less than 4.5%;
    receiving video data from a far-end camera corresponding to the far-end device; and
    rendering the received video data in the video window at the determined location for the video window on the near-end screen.

2. The method of claim 1, wherein determining the location for the video window on the near-end screen, the determined location configured to reduce the eye gaze error comprises determining the location for the video window on the near-end screen, the determined location configured to produce a horizontal eye gaze error in the near-end image transmitted to the far-end device from the near-end camera equal to one of the following: 2% and less than 2%.

3. The method of claim 1, wherein determining the location for the video window on the near-end screen, the determined location configured to reduce the eye gaze error comprises determining the location for the video window on the near-end screen, the determined location configured to produce a horizontal eye gaze error in the near-end image transmitted to the far-end device from the near-end camera equal to one of the following: 1% and less than 1%.

4. The method of claim 1, wherein determining the location for the video window on the near-end screen, the determined location configured to reduce the eye gaze error comprises determining the location for the video window on the near-end screen, the determined location configured to reduce the eye gaze error comprising vertical eye gaze error.

5. The method of claim 1, wherein determining the location for the video window on the near-end screen, the determined location configured to reduce the eye gaze error comprises determining the location for the video window on the near-end screen, the determined location configured to produce a vertical eye gaze error in the near-end image transmitted to the far-end device from the near-end camera equal to one of the following: 5.5% and less than 5.5%.

6. The method of claim 1, wherein determining the location for the video window on the near-end screen, the determined location configured to reduce the eye gaze error comprises determining the location for the video window on the near-end screen, the determined location configured to produce a vertical eye gaze error in the near-end image transmitted to the far-end device from the near-end camera equal to one of the following: 2.5% and less than 2.5%.

7. The method of claim 1, wherein determining the location for the video window on the near-end screen, the determined location configured to reduce the eye gaze error comprises determining the location for the video window on the near-end screen, the determined location configured to reduce the eye gaze error comprising both horizontal eye gaze error and vertical eye gaze error.

8. The method of claim 1, further comprising,
prior to rendering the received video data in the video window at the determined location for the video window on the near-end screen, detecting a region of interest in the received video data wherein a far-end image of a user is located in the detected region of interest to further reduce the eye gaze error in the near-end image transmitted to the far-end device from the near-end camera; and
wherein rendering the received video data in the video window comprises rendering the detected region of interest.

9. The method of claim 1, further comprising,
prior to rendering the received video data in the video window at the determined location on the near-end screen, detecting a region of interest in the received video data wherein a far-end image of a user is located at the top of the detected region of interest to further reduce the eye gaze error in the near-end image transmitted to the far-end device from the near-end camera; and
wherein rendering the received video data in the video window comprises rendering the detected region of interest.

10. The method of claim 1, further comprising,
prior to rendering the received video data in the video window at the determined location on the near-end screen, detecting a region of interest in the received video data wherein a far-end image of a user is located at the top of the detected region of interest to further reduce the eye gaze error in the near-end image transmitted to the far-end device from the near-end camera;
transmitting to the far-end device the location of the region of interest;
receiving the video data comprising only the region of interest from the far-end camera; and
wherein rendering the received video data in the video window comprises rendering the received region of interest.

11. The method of claim 1, wherein determining the location of the near-end camera relative to the near-end screen comprises determining the location of the near-end camera relative to the near-end screen wherein the near-end camera is located near an edge of the near-end screen.

12. A computer-readable storage medium that stores a set of instructions which when executed perform a method for providing eye gaze reduction, the method executed by the set of instructions comprising:
determining a location of a near-end camera relative to a near-end screen;
determining, based upon the determined location of the near-end camera, a location for a video window on the near-end screen, the determined location configured to reduce a horizontal eye gaze error in a near-end image transmitted to a far-end device from the near-end camera;
receiving video data from a far-end camera corresponding to the far-end device;
detecting a region of interest in the received video data wherein a far-end image of a user is located in the detected region of interest to further reduce the horizontal eye gaze error in the near-end image transmitted to the far-end device from the near-end camera; and
rendering the detected region of interest from the received video data in the video window at the determined location for the video window on the near-end screen.

13. The computer-readable storage medium of claim 12, wherein determining the location for the video window on the near-end screen, the determined location configured to reduce the horizontal eye gaze error comprises determining the location for the video window on the near-end screen, the determined location configured to produce the horizontal eye gaze error in the image transmitted to the far-end device from the near-end camera equal to one of the following: 4.5% and less than 4.5%.

14. The computer-readable storage medium of claim 12, wherein determining the location for the video window on the near-end screen, the determined location configured to reduce the horizontal eye gaze error comprises determining the location for the video window on the near-end screen, the determined location configured to produce the horizontal eye gaze error in the image transmitted to the far-end device from the near-end camera equal to one of the following: 2% and less than 2%.

15. The computer-readable storage medium of claim 12, wherein determining the location for the video window on the near-end screen, the determined location configured to reduce the horizontal eye gaze error comprises determining the location for the video window on the near-end screen, the determined location configured to produce the horizontal eye gaze error in the image transmitted to the far-end device from the near-end camera equal to one of the following: 1% and less than 1%.

16. The computer-readable storage medium of claim 12, wherein determining the location of the near-end camera relative to the near-end screen comprises determining the location of the near-end camera relative to the near-end screen wherein the near-end camera is located near an edge of the near-end screen.

17. A system for providing eye gaze reduction, the system comprising:
a memory storage; and
a processing unit coupled to the memory storage, wherein the processing unit is operative to:
determine a location of a near-end camera relative to a near-end screen;
determine, based upon the determined location of the near-end camera, a location for a video window on the near-end screen, the determined location configured to produce a horizontal eye gaze error in a near-end image transmitted to a far-end device from the near-end camera equal to one of the following: 4.5% and less than 4.5%;
receive video data from a far-end camera corresponding to the far-end device;
detect a region of interest in the received video data wherein a far-end image of a user is at the top of the detected region of interest; and
render the detected region of interest from the received video data in the video window at the determined location for the video window on the near-end screen.

18. The system of claim 17, wherein the processing unit being operative to determine the location of the near-end camera relative to the near-end screen comprises the processing unit being operative to determine the location of the near-end camera relative to the near-end screen wherein the near-end camera is located near an edge of the near-end screen.

19. A method for providing eye gaze reduction, the method comprising:

determining a location of a near-end camera relative to a near-end screen;

determining, based upon the determined location of the near-end camera, a location for a video window on the near-end screen, the determined location configured to reduce an eye gaze error in a near-end image transmitted to a far-end device from the near-end camera wherein determining the location for the video window on the near-end screen, the determined location configured to reduce the eye gaze error comprises determining the location for the video window on the near-end screen, the determined location configured to produce a vertical eye gaze error in the near-end image transmitted to the far-end device from the near-end camera equal to one of the following: 5.5% and less than 5.5%;

receiving video data from a far-end camera corresponding to the far-end device; and rendering the received video data in the video window at the determined location for the video window on the near-end screen.

20. The method of claim 19, wherein determining the location for the video window on the near-end screen, the determined location configured to reduce the eye gaze error comprises determining the location for the video window on the near-end screen, the determined location configured to produce a vertical eye gaze error in the near-end image transmitted to the far-end device from the near-end camera equal to one of the following: 2.5% and less than 2.5%.

21. A method for providing eye gaze reduction, the method comprising:

determining a location of a near-end camera relative to a near-end screen;

determining, based upon the determined location of the near-end camera, a location for a video window on the near-end screen, the determined location configured to reduce an eye gaze error in a near-end image transmitted to a far-end device from the near-end camera;

receiving video data from a far-end camera corresponding to the far-end device;

rendering the received video data in the video window at the determined location for the video window on the near-end screen;

prior to rendering the received video data in the video window at the determined location for the video window on the near-end screen, detecting a region of interest in the received video data wherein a far-end image of a user is located in the detected region of interest to further reduce the eye gaze error in the near-end image transmitted to the far-end device from the near-end camera; and wherein rendering the received video data in the video window comprises rendering the detected region of interest.

22. A method for providing eye gaze reduction, the method comprising:

determining a location of a near-end camera relative to a near-end screen;

determining, based upon the determined location of the near-end camera, a location for a video window on the near-end screen, the determined location configured to reduce an eye gaze error in a near-end image transmitted to a far-end device from the near-end camera;

receiving video data from a far-end camera corresponding to the far-end device;

rendering the received video data in the video window at the determined location for the video window on the near-end screen;

prior to rendering the received video data in the video window at the determined location on the near-end screen, detecting a region of interest in the received video data wherein a far-end image of a user is located at the top of the detected region of interest to further reduce the eye gaze error in the near-end image transmitted to the far-end device from the near-end camera; and wherein rendering the received video data in the video window comprises rendering the detected region of interest.

23. The method of claim 22, further comprising, prior to rendering the received video data in the video window at the determined location on the near-end screen, detecting a region of interest in the received video data wherein a far-end image of a user is located at the top of the detected region of interest to further reduce the eye gaze error in the near-end image transmitted to the far-end device from the near-end camera;

transmitting to the far-end device the location of the region of interest;

receiving the video data comprising only the region of interest from the far-end camera; and wherein rendering the received video data in the video window comprises rendering the received region of interest.

* * * * *